US007340347B2

United States Patent
Shray et al.

(10) Patent No.: US 7,340,347 B2
(45) Date of Patent: Mar. 4, 2008

(54) METHOD TO VISUALIZE THREE DIMENSIONAL LOG DATA ON TWO DIMENSIONAL MEDIA

(75) Inventors: Frank P. Shray, Le Plessis Robinson (FR); JingKun Yu, Beijing (CN)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/321,886

(22) Filed: Dec. 29, 2005

(65) Prior Publication Data

US 2007/0156340 A1    Jul. 5, 2007

(51) Int. Cl.
*G01V 9/00* (2006.01)
(52) U.S. Cl. ........................................................ 702/11
(58) Field of Classification Search ................ 702/6, 702/7, 8, 9, 11, 12, 13
See application file for complete search history.

(56) References Cited

U.S. PATENT DOCUMENTS

| | | | |
|---|---|---|---|
| 6,031,541 A * | 2/2000 | Lipscomb et al. .......... 345/420 |
| 6,109,368 A * | 8/2000 | Goldman et al. ............. 175/39 |
| 6,215,499 B1 * | 4/2001 | Neff et al. ................... 345/419 |
| 6,862,530 B2 | 3/2005 | Fleury | |
| 2002/0180728 A1 * | 12/2002 | Neff et al. ................... 345/419 |
| 2004/0204855 A1 * | 10/2004 | Fleury et al. .................. 702/6 |

* cited by examiner

*Primary Examiner*—Donald E McElheny, Jr.
(74) *Attorney, Agent, or Firm*—Hoffman, Warnick & D'Alessandro LLC

(57) ABSTRACT

This invention relates to methods and systems for displaying geological formation data obtained through well logging in the technical field of petroleum engineering. In one embodiment of this invention, two or more cylindrical surfaces are provided each representing a depth of investigation. The cylindrical surfaces can be dissected into different sectors along azimuths of interest to the human operator. Images of formation information data are attached to (or exposed by) cylindrical surfaces and wings exposed by dissection. Each sector can be displayed individually or together with other sectors so that the human operator can easily analyze the results. Further, the systems and methods can be used to display not only raw well logging data or processed well logging data, but also interpretations of the analysis so that a person unfamiliar with well logging analysis can easily comprehend the results of the analysis.

10 Claims, 14 Drawing Sheets

METHOD TO VISUALIZE THREE DIMENSIONAL LOG DATA ON TWO DIMENSIONAL MEDIA

FIELD OF THE INVENTION

The present invention relates generally to geological formation information. More particularly, the present invention relates to methods for displaying three dimensional geological formation information.

BACKGROUND OF THE INVENTION

Determining properties of subsurface earth formation is a critical element in maximizing the profitability of oil and gas exploration and production. In order to improve oil, gas, and water exploration, drilling, and production operations, it is necessary to gather as much information as possible on the properties of the underground formation formations as well as the environment in which drilling takes place. Thus, well logging typically produces a large amount of information that needs to be analyzed to provide insights into the geological formation properties. The data to be analyzed are typically derived from logging operations using different instruments to probe various geophysical properties. Each of these instrument may generate an enormous amount of data, rendering the analysis difficult. In addition, it is often necessary to compare and contrast data from different measurements to gain insights into the formation properties.

For example, neutron tools are often used to provide information on formation porosity because formation liquids in pores interact with neutrons. However, because both water and hydrocarbons produce signals in neutron measurements, neutron logging data by themselves cannot reveal which pores contain water and which contain hydrocarbons. On the other hand, resistivity tools can easily differentiate whether a formation liquid is water or hydrocarbons, due to the high contrast in resistivity/conductivity in these two types of fluids. A combined use of these two measurements can provide information as to which formation pores contain hydrocarbons. In order to derive useful information from various formation logging data, it is a common practice to present each measurement data set in a strip chart graph ("track") and align various graphs side by side for analysis.

For example, FIG. 1 shows a typical prior art methods of presenting a plurality of logging data as side-by-side tracks for analysis. The presentation shown in FIG. 1 is a standard format prescribed in, for example, Standard Practice 31A, published by the American Petroleum Institute, Washington, D.C. In this example, tracks 50, 54, 56 each include a header 57 which indicates the data type(s) for which a data curve or curves 51, 53, 55, 59 are presented in each track. Well log data are typically recorded with reference to the depth of well. A depth track 52, which shows the measured depth (MD, the depth from the top of the well along the borehole) of the data, is typically included in the graph as shown in FIG. 1 to provide a representation of the well.

A presentation such as shown in FIG. 1 may include in the various curves 51, 53, 55, 59 "raw" data, such as detected voltages, detector counts, etc. actually recorded by well log instrument, or more commonly, a parameter of interest that is derived from the raw data, such as gamma density, neutron porosity, resistivity, acoustic travel time, etc.

The data tracks presented in a conventional graph (e.g., curves 51, 53, 55, 59 in tracks 50, 54, 56 of FIG. 1) have several drawbacks. First of all, the conventional graphs were designed to present two dimensional well log data. Such graphs were sufficient for displaying well logging data obtained using the traditional well logging tools with sensors to measure two dimensional data only. Modem well logging tools, however, often include an array of sensors installed on the outer surface of the tool. At any particular depth, the sensors on the tool can measure formation properties in several directions around the surface of the borehole. While the tool travels through the borehole, well logging data are continuously recorded against the MD. Thus well logging data obtained using modem well logging tools are three dimensional and not two dimensional. To present such three dimensional well logging data on a two dimensional graph would require manipulation of the date, such as taking an average of the data at different MD, or take a two dimensional "slice." Both methods fail to present the three dimensional data in the form they existed, and there have been attempts to represent formation property data in three dimensions. One such attempt is the three dimensional visualization method disclosed by U.S. Pat. No. 6,862,530, and shown in FIG. 2. According the '530 patent, the borehole trajectory is accurately depicted with respect to its MD, true vertical depth (TVD, the depth measured vertically from the ground surface), azimuth and deviation. Formation property data graphs are attached on (or exposed by) to the borehole surface. It is possible to display two separate sets of graphs of formation data using two cylinders, one cylinder in solid color and the second cylinder translucent. However, because both cylinders are plotted on the same surface, it is difficult to see both cylinders at the same time. For example, it is hard to see the second cylinder clearly if its color is too light. On the other hand, making the second cylinder darker will prevent one from seeing the first cylinder clearly.

Another drawback of the system disclosed by the '530 patent is that the method is primarily designed to display formation information of or adjacent to the borehole. For example, radius is a property of the borehole while conductivity is a property of the formation adjacent to the bore hole. Both data are suitable for displaying using the method of the '530 patent. To display such information, one needs to plot the information "wrapped around" the borehole as shown by FIG. 2. A reservoir engineer, however, often desires to understand "deep" formation information, which is the formation information away from the borehole. This is because data obtained on or adjacent to the borehole are often not a true indication of the formation property due to damages caused during the drilling process, such as damages caused by drilling fluid pressure and chemicals. In order to determine formation information away from the borehole, modern logging tools are designed to measure formation information a far distance away from the borehole. For example, with modern well logging tools measurement made at a location 90 ft away from the borehole is possible. It is foreseeable that in the near future well logging tools would allow the investigation of formation information at even farther distances away from the well borehole. Currently well logging tools with capability of determining deep formation information include tri-axial induction, crosswell electromagnetic imaging, borehole seismic and acoustic imaging, compressional radial difference, etc and tools under the Schlumberger Technology Corporation's service names of MSIP (Sonic Scanner), MRX (MR Scanner), FMI, OBMI, and Decision Express, etc. The method of '530 patent was not designed for displaying this type of data.

In a closely related technical field, there are also efforts to present three dimensional seismic data on a two dimensional plane as shown in FIG. 3. There is no well borehole involved, as normally seismic information is obtained without drilling a well. There are three known methods to displaying the data at locations that do not fall on the surface of the cube. The first way is to slice the cube so that the point of interest is exposed. The second way is to make the cube translucent and hope to see the point of interest. The third way is to use a complex virtual reality system and figuratively walk into the cube to the point of interest. A variation of the seismic cube, using two simultaneous slices through the cube, is shown in FIG. 4. This technology is not suitable for presentation of well logging data because, rather than analyzing data at one specific point, a user of well logging data is more often interested in looking at the change of certain data along a certain dimension, such as the azimuth or the MD. Seismic cube does not allow such comparison easily.

SUMMARY OF THE INVENTION

One aspect of the invention relates to methods for displaying three dimensional geological formation information, such as well logging data. A method for displaying geological formation information in accordance with the invention includes displaying several cylindrical surfaces each representing a depth of investigation and attaching images representing geological formation information on the cylindrical surfaces. The several cylindrical surfaces are substantially concentric to each other. Images representing geological formation information determined on or near the borehole, such as borehole radius, are attached on (or exposed by) a cylindrical surface representing the borehole, while images representing deep formation information are attached on (or exposed by) larger cylindrical surfaces with radiuses representing the depth of investigation and are concentric to the borehole. In addition, when the geological formation is divided or sliced to be a large number of cells, the values of the cells that are along the slice can be exposed and displayed.

Another aspect of the invention relates to methods for displaying three dimensional formation data by displaying the data on the cylindrical surface and wings of the sectors dissected from the cylindrical surfaces. In one embodiment the human operator enters an instruction using the input devices of the computer to cause the cylindrical surface to be dissected by planes coplanar with the axis of the borehole along selected azimuths. The sectors can be selectively moved away from each other and viewed at an angle desirable to the human operator, which is often an angle that facilitates the human operator to see the particular points of interest.

Another aspect of the invention relates to a system for displaying geological formation information, which includes a display and a computer operatively coupled to the display, the computer having a software program, the software program having instructions for displaying geological formation. The instructions of the computer program causes images of geological formation information to be attached on (or exposed by) several cylindrical surfaces each representing a depth of investigation. The several cylindrical surfaces are substantially concentric to each other. Images of formation information determined on or near the borehole, such as borehole radius, are attached on (or exposed by) a cylindrical surface representing the borehole, while images of deep formation information are attached on (or exposed by) larger cylindrical surfaces with radiuses representing the depth of investigation and are concentric to the axis of the borehole.

Another aspect of the invention relates to a system for displaying geological formation information, which includes a display and a computer operatively coupled to the display, the computer having a software program, the software program having instructions for displaying the data on the cylindrical surface of sectors dissected from cylindrical surfaces representing different depth of investigation. In one embodiment the human operator can enter an instruction using the input devices of the computer to cause the cylindrical surface to be dissected along certain azimuth by planes coplanar with the axis of the borehole. The sectors can be selectively moved away from each other and viewed at an angle desirable to the human operator. The angle is often an angle that facilitates the human operator to see the particular point of interest.

The systems and methods of this invention allow convenient and simultaneous display and description of the borehole and formation at multiple radial depths of investigation. Geological formation data such as formation density, porosity, resistivity, velocity, composition, grain structure, permeability, fluid saturation, temperature, pressure, etc. can be displayed using the systems and methods. The systems and methods can also be used to display formation fluid parameters, such as type, viscosity, composition, resistivity, temperature, and descriptions of the state or condition of the borehole and formation, such as their size, shape, strength, stress, and state of alteration. The systems and methods of this invention can be used to present changes to any of these parameters, such as changes occurring over time or due to the process of fluid invasion and fluid production. The display can further be used to present interpretation results of well logging analysis.

Other aspects and advantages of the invention will be apparent from the following description and the appended claims.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION OF THE INVENTION

Embodiments of this invention relate to methods and systems for visualizing three dimensional geological formation information such as well logging data and log analysis results on two dimensional media, such as a computer display or a piece of paper. The systems attach images representing geological formation data on concentric cylindrical surfaces representing different depth of investigation, or on wings of sectors dissected from the cylindrical surfaces. Usually, but not necessarily, one of the concentric cylindrical surfaces is the well borehole.

Figure 1:
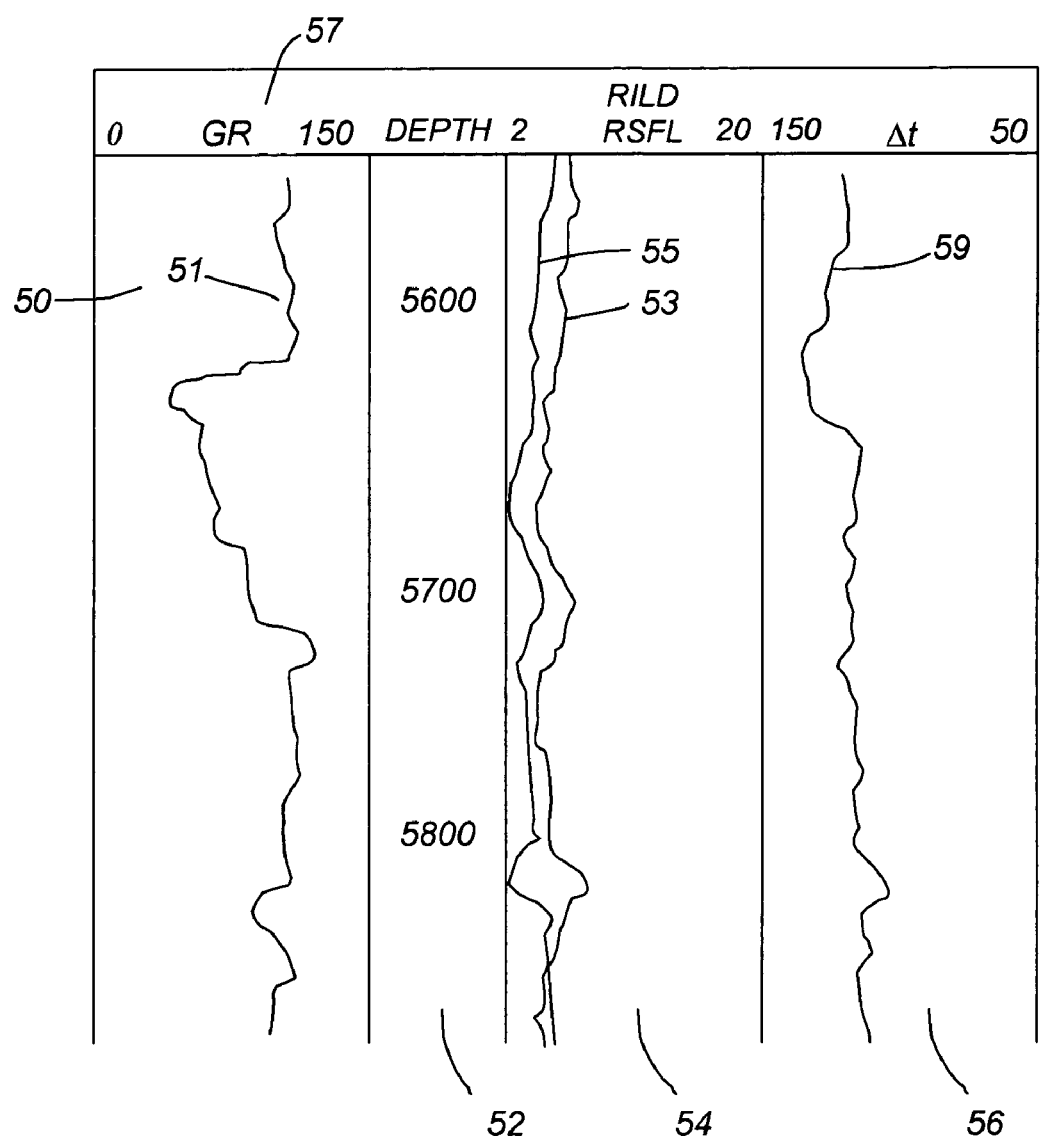
FIG. 1 shows a diagram illustrating a graphical representation of a well log data presentation in the prior art.
Figure 2:
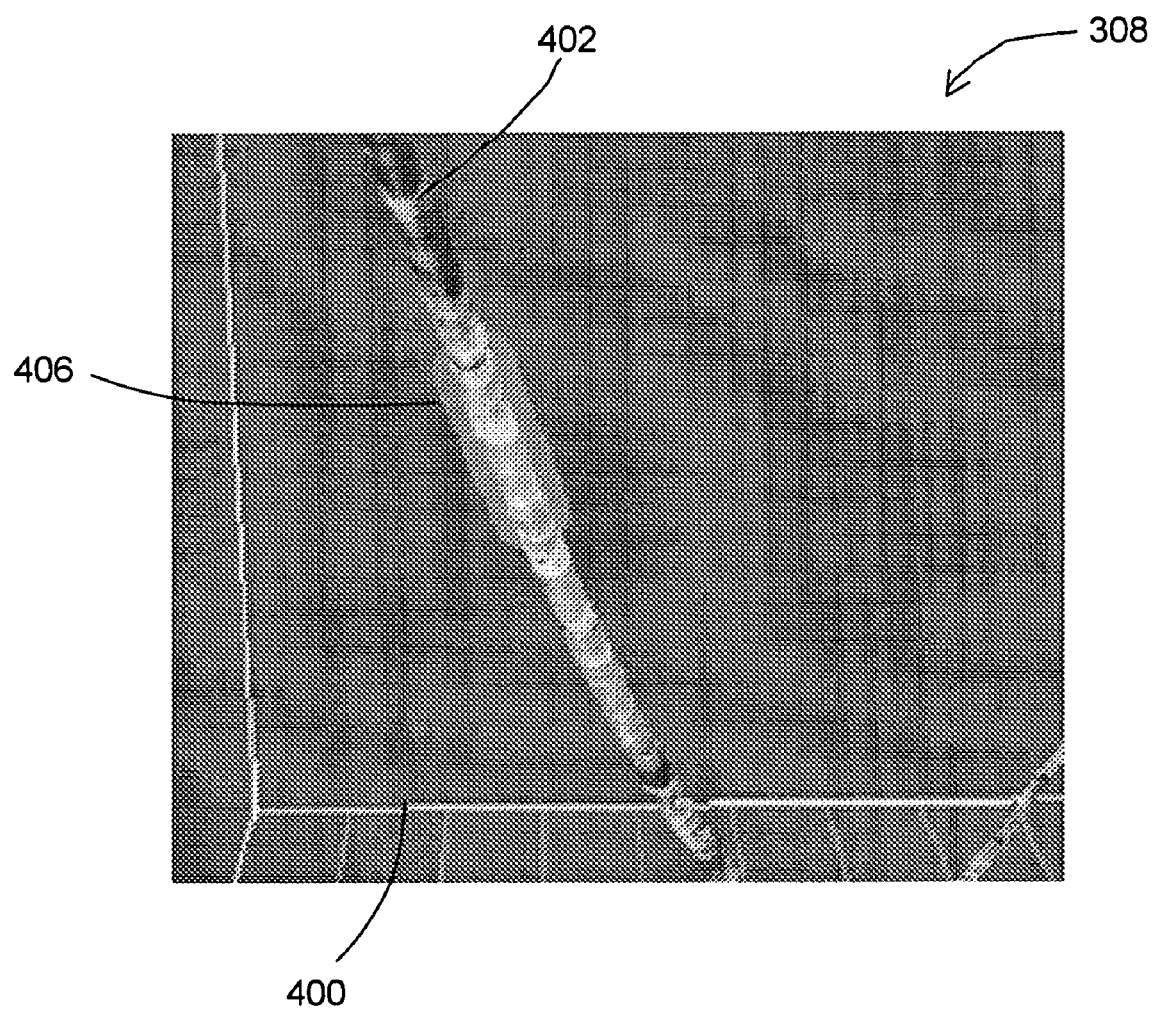
FIG. 2 shows a diagram illustrating a visualization system of formation information system along the borehole in the prior art.
Figure 3:
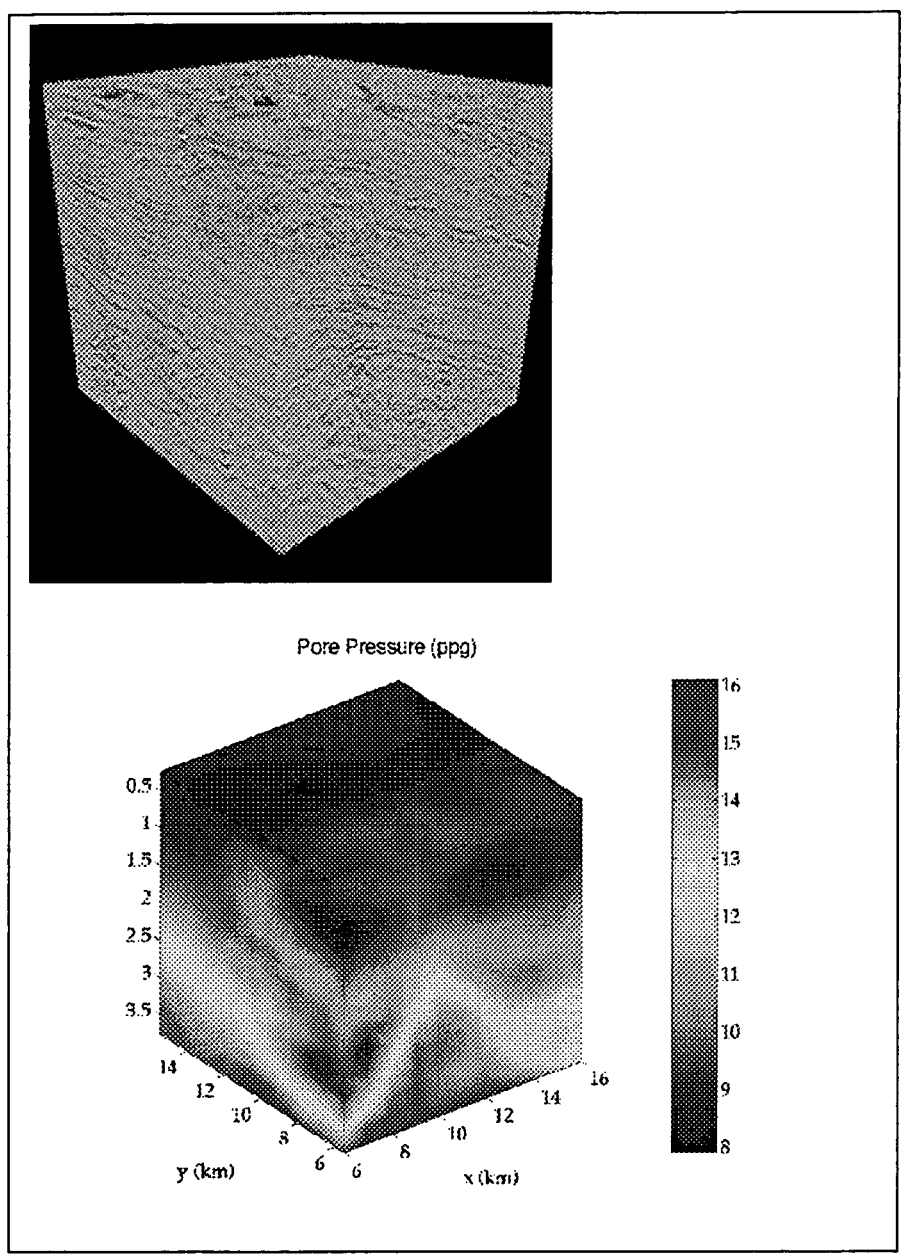
FIG. 3 shows a seismic cube 3-dimensional representation of geological data in the prior art.
Figure 4:
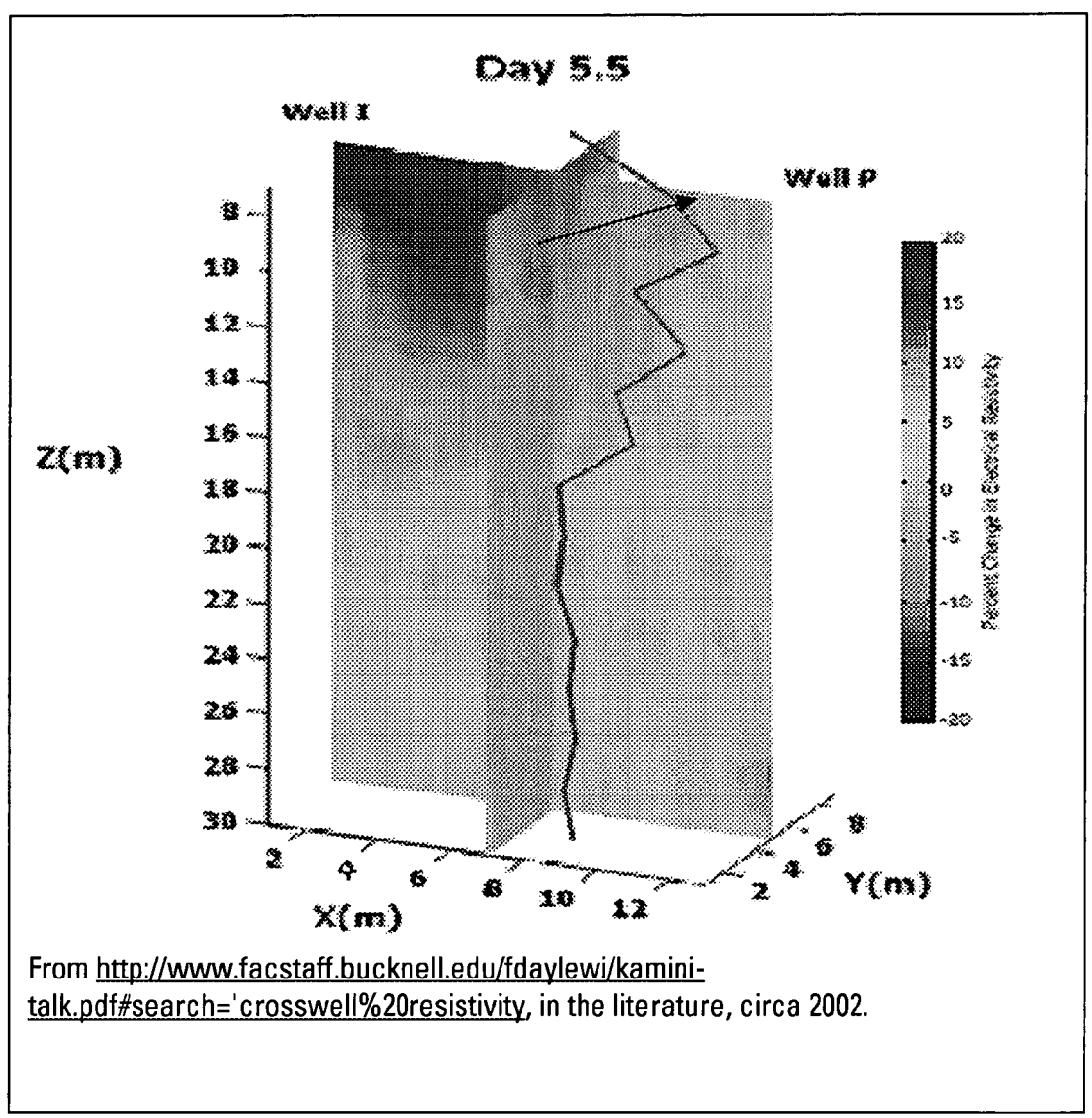
FIG. 4 shows a method for presenting 3-dimensional formation information not involving a borehole in the prior art.
Figure 5:
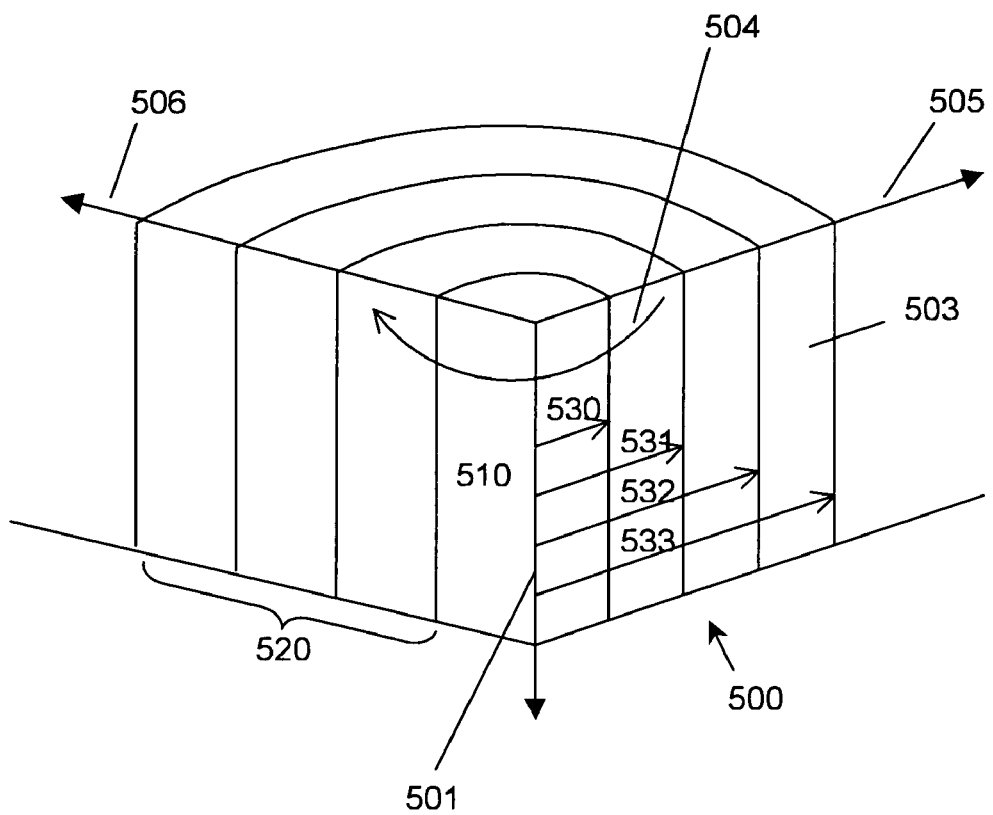
FIG. 5 shows a sector of geological formation according to this invention with arcs representing different depths of investigation.

FIG. 5 shows a section of geological formation 500 with a borehole 510 drilled through the middle portion. Two substantially vertical planes dissecting each other through the axis of the borehole 510 divides the geological formation into four sectors, and only one sector is shown in FIG. 5. The hollow space at the edge of the sector depicts a sector of the borehole 510. 530 represents the radius of the borehole although it is to be understood that the radius of the borehole 510 changes at different MD and towards different azimuth. It is to be understood that the axis of the borehole is usually not vertical, because on the one hand it is hard to keep the borehole vertical technically, and on the other hand, it is often desirable to drill directional or horizontal wells in modern petroleum engineering. In FIG. 5, 531, 532, and 533 each represent a different depth of investigation. Depth of investigation in this invention is defined as either the distance between the point of investigation and the borehole surface or from the tool within the borehole.

Because only a sector of the geological formation is shown in FIG. 5, it is possible to see the "wing" 520, which is the cut-away surface of the geological formation by a plane. Therefore it is possible to see a data image attached on (or exposed by) a wing 520. Images representing geological formation data can be built using spikes of height, for example, a higher value is depicted with a higher spike, and a lower value depicted with a lower spike. Such images can also be built with colors, patterns, realistic representations of rocks and fluids, numbers, symbols, etc. Further, such images can also be built using a combination of colors, patterns, realistic representations of rock and fluids, numbers, symbols, etc. In one embodiment of this invention, red color depicts higher values, and dark blue color depicts lower values. In another embodiment, alternatively, the human operator chooses one color for high value and chooses another color for the low value. Any intermediate values are depicted by different shades of "grey" colors between the high value color and low value color. In an alternative embodiment the system was so designed to display the value with a combination of spikes and color.

Figure 6A:
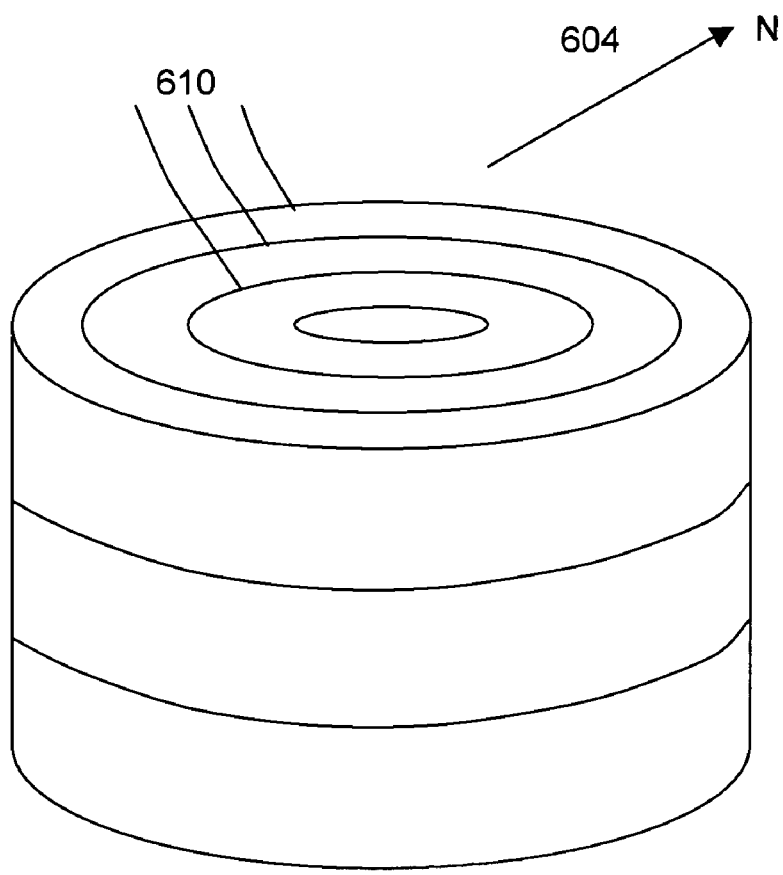
FIG. 6A shows a section of geological formation with a borehole drilled in the middle portion and concentric rings representing different depths of investigation.

FIG. 6A is a schematic diagram of a geological formation showing a substantially vertical borehole drilled though the middle portion. The concentric rings represent different radial distances away from the borehole. The concentric rings are also the edge line of concentric cylindrical surfaces along the well borehole. In this configuration, formation information data images attached on (or exposed by) the concentric cylindrical surfaces cannot be seen because they are all hidden by the formation.

Figure 6B:
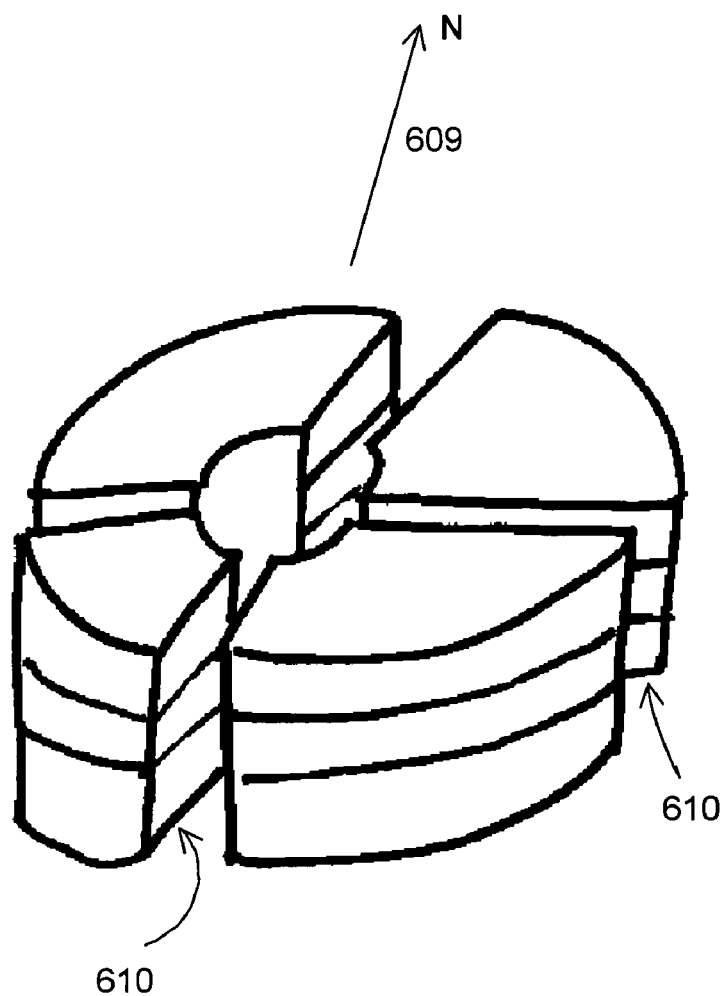
FIG. 6B shows schematically a section of geological formation dissected into four sectors exposing wings of the sectors.

FIG. 6B is a schematic diagram where the formation is divided into four sectors by two intersecting planes, and each sector is moved away from the other sector according to this invention. In this configuration, a human operator would be able to see clearly formation information data images attached on (or exposed by) wing 610 if the neighboring sectors are moved away. Only one view of the relative positions of the four sectors are shown in FIG. 6B, but the system of this invention allows the sectors to be moved to different locations and viewed from different angles based on instructions from a human operator. In one particular embodiment, the two planes dissecting the geological formation are perpendicular to each other, and as a result each of the 4 sectors form quadrants. A quadrant in this invention is defined as a sector with a center angle of 90-degree.

In FIG. 6A and FIG. 6B, the formation can be dissected into sectors with reference to different azimuths. In one embodiment the reference azimuth can be the magnetic north direction, such as 604 in FIG. 6A and 609 in FIG. 6B. During the logging operation a gyro device keeps track of the magnetic north azimuth and all other data is recorded relative to magnetic north. Thus magnetic north is a convenient reference azimuth. In another embodiment the reference azimuth is the fast shear azimuth. In yet another embodiment the reference azimuth is the slow shear azimuth.

According to this invention, the systems and methods allow the human operator to choose to view the data images attached on (or exposed by) to the cylindrical surfaces and wings from any direction and with any scales. For example, the systems and methods allow the human operator to choose to view a display of the formation and borehole sectors together, or to view only the borehole or only one or several sectors. Some sectors can be removed from the other sectors and placed at a different location in order to show the data image attached on (or exposed by) a certain wing. If the human operator decides to view the sectors together, the systems and methods allows him to change the size of the gap between the sectors. The systems and methods also allow some of the sectors to be combined to form larger sectors, or to allow quadrants to be combined to form halves, or three-quarter sections. The systems and methods of this invention also allows the human operator to focus on a particular part that is interesting to him and zoom in and out of the that part.

The methods and systems of this invention provide for scale selectors which the human operator may use. The scale selectors allow the human operator to change the relative scale between the radial and the axial orientations. In one embodiment of this invention an interactive scale selector is used. The human operator can set the relative scale in the X, Y and Z directions to values of his choice in a Cartesian (or Polar) coordinate system. In such a Cartesian coordinate system the Z direction usually represents the direction of the borehole, and each of the X and Y directions represent a direction perpendicular to the Z direction and to each other. For example, at a scale of X:Y:Z=1:1:1, the borehole length and the radial distances are presented at the same scale, thus the entire picture of the borehole would be long and slender. On the other hand, setting the scale to X:Y:Z=1:1:1000 would compress the length of the borehole and produce a "fatter" display that is easier to analyze.

In another embodiment of this invention, an automatic scale selector is provided for.

The automatic scale selector of this invention selects a scale by comparing the length of the borehole presented in a display and the relative size of the radial distances.

Figure 7A:
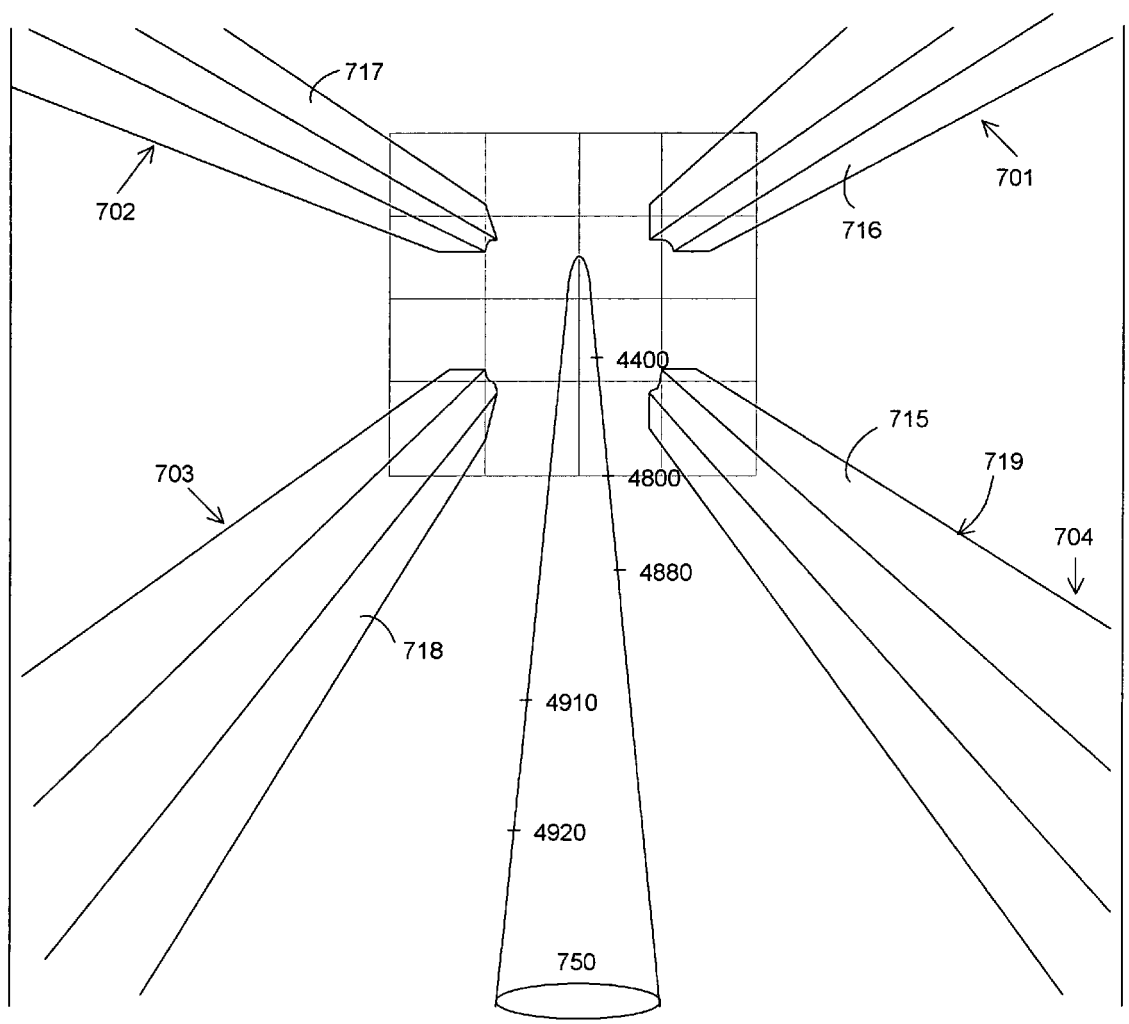
FIG. 7A shows a geological formation with a well borehole drilled in the middle and the formation dissected into 4 sectors with geological data attached to (or exposed by) the wings of the sectors.

FIG. 7A shows a section of geological formation divided into 4 sectors according to this invention. The 4 sectors 701, 702, 703, and 704 are all moved away from borehole 750.

The human operator views the system from the bottom of the borehole, and all the sectors and the borehole is within his view at the same time. Geological formation information data images attached to (or exposed by) wings 715, 716, 717, and 718 can be viewed. In this configuration, geological formation information data image attached on (or exposed by) wings 715, 716, 717, and 718 are obtained by interpolation using the data obtained at borehole 750 and at outer cylindrical surface 719. In another embodiment, the geological formation can be further divided to a plurality of "cells" (not shown). Each cell can represent some fractional volume of the geological formation, and contain values (values for resistivity, values for porosity, etc.) of the properties of the geological formation that were measured or inferred by the logging tool sensors. The cells can be arranged in a logical manner, such as a Cartesian or a polar coordinate system method. When the geological formation is divided or sliced, the values of the cells that are along the slice can be exposed. A coding can be applied to represent the value of the each cell that has been exposed by any slice or surface. In such configuration, geological formation information data image attached on (or exposed by) wings are obtained by coding the borehole and formation values of the cells that have been exposed, and the exposed values of the cells can also be displayed.

Figure 7B:
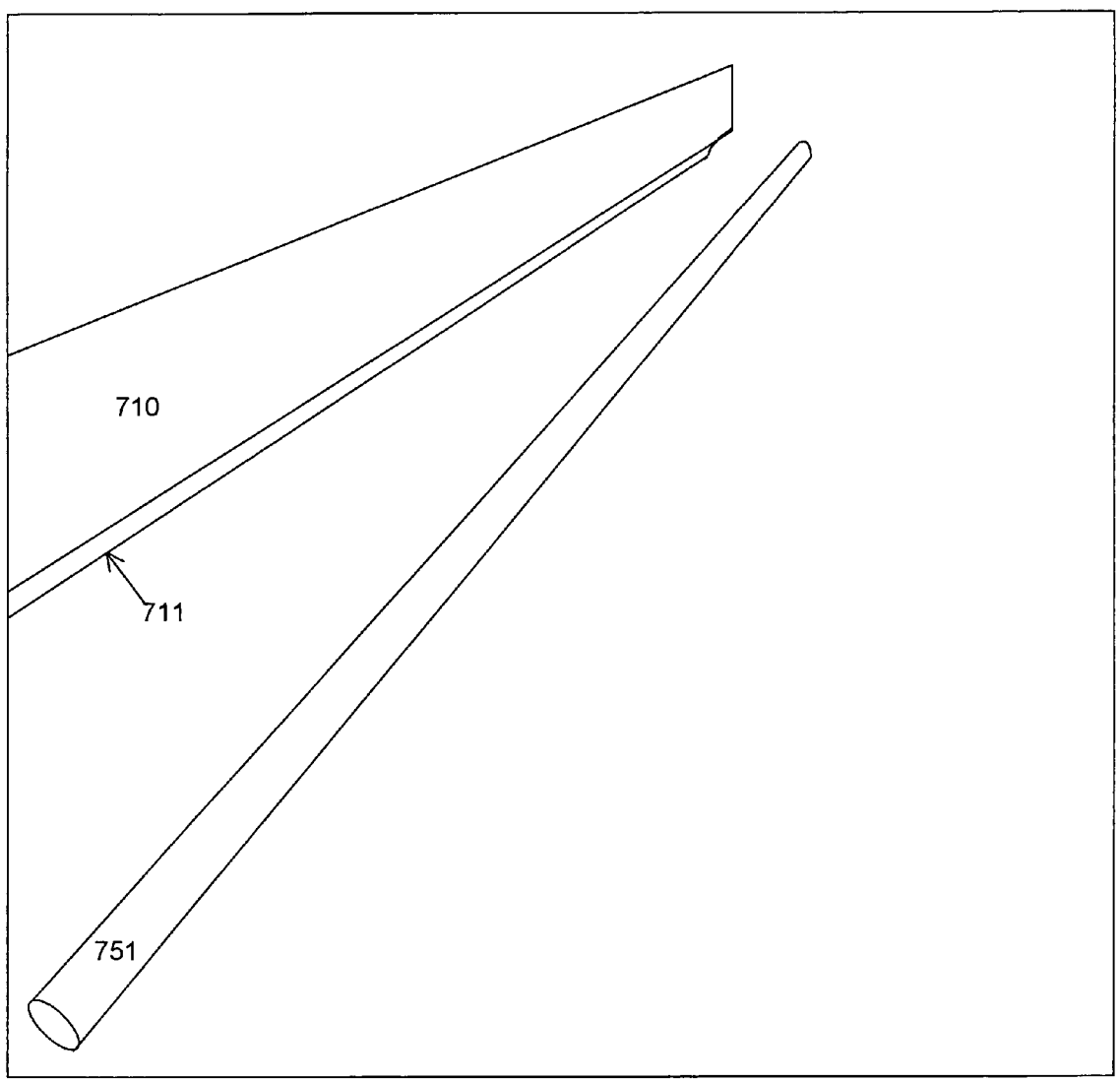
FIG. 7B shows a sector of geological formation with images representing geological formation data attached to (or exposed by) the wings and a borehole according to this invention.
Figure 7C:
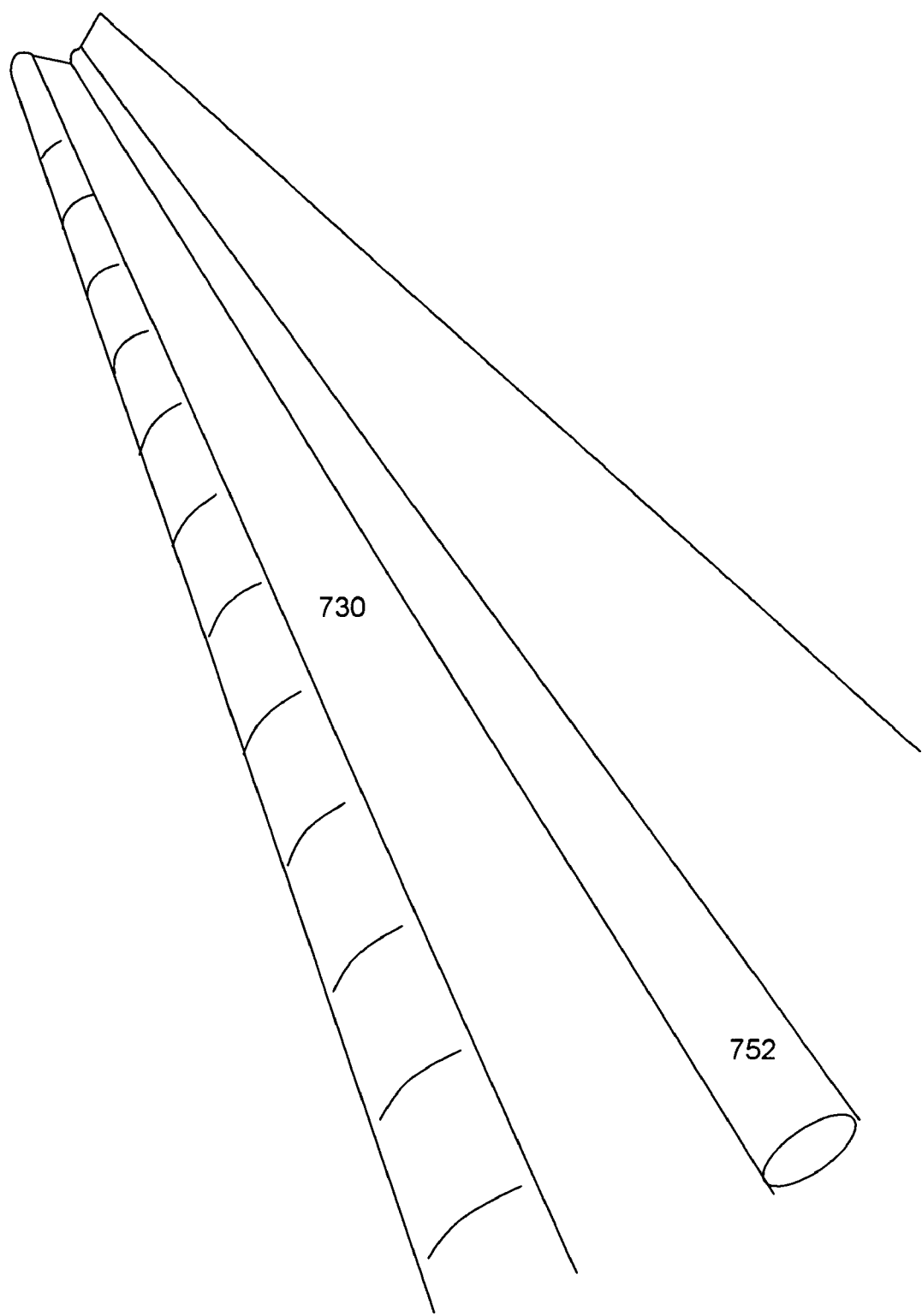
FIG. 7C shows a sector of geological formation with images representing geological formation data attached to (or exposed by) the wings and cylindrical surface and a borehole according to this invention.

In another configuration shown by FIG. 7B, however, only one sector 711 and the borehole 751 is displayed, the other sectors have not been shown for better clarity. Geological formation information images attached to (or exposed by) wing 710 is viewed easily in FIG. 7B. In FIG. 7C, a large sector 730 representing 270 degrees of the formation and the borehole 752 are displayed together. In FIGS. 7A, 7B, and 7C, geological data images are attached to (or exposed by) the wings for easy display and analysis by the human operator.

The methods and systems of this invention allow the display to be rotated to any direction that facilitates the analysis of the data. The human operator can view the geological formation from the center of the borehole outwards, or rotate around the borehole to view the azimuthal and radial information. The human operator can also choose to view the geological formation from outside. FIGS. 7A, 7B, and 7C show views of the geological formation by rotating the formation in accordance with the instruction of the human operator.

The systems and methods of this invention allow three dimensional data to be displayed on two dimensional media such as a piece of paper and the computer display screen. For example, FIGS. 7A, 7B, and 7C all display three dimensional geological formation structure with data images attached to (or exposed by) the cylindrical systems and wings in two dimensions. When the same structures are displayed on the computer screen, the human operator can modify the scale and the vantage point as he desires by giving a command through the computer input devices.

The systems and methods of this invention allow the human operator to either manually or automatically adjust the radial distance that is presented. For example, in an automatically operated mode, the display would begin by showing the borehole and formation out to a radial distance of 12 inches; after a few seconds, the formation information between radial distance of 12 to 24 inches would appear, then from 24 to 36 inches, and so forth. This feature gives the human operator another method by which to appreciate how the formation information change spatially. The duration of time within which a specific display is shown can be adjusted by the human operator.

The systems and methods of this invention also allows the human operator to either manually or automatically view data taken from different logging trips over a period of time. For example, formation fluid property may have changed over the production history of the well. Thus different well logging trips would produce different data for formation fluid properties. In an automatically operated mode, the display would began by showing the data taken during the first logging trip for a few seconds, then the data taken during the second logging trip for a few seconds, and then the data taken from the third logging trip. This would allow the human operator to visually appreciate how the formation information has changed as time goes on.

There are many different types of oil well logging devices which generate different types of data. Some of these data are highly directional (azimuthal) in nature, while others are omni-directional. Some devices have measurement volumes that are small and focused, some are not. The methods and systems of this invention is suitable to be used to present all types of data generated with the various logging devices. Using the methods and systems of this invention the data are displayed within the actual volume in which it was measured by a sensor. This would then allow the human operator to determine whether or not two different tools measured the same volume of formation at any given depth.

Figure 8:
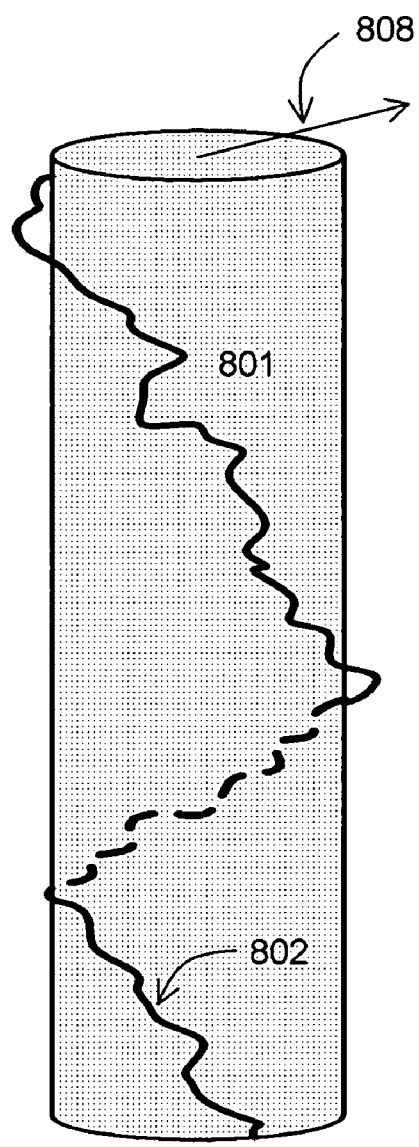
FIG. 8 shows a borehole with a sensor azimuth track displayed thereon.

Because the well logging devices are usually operated with a wire cable hoisted from the ground surface, or "top of well", it is usually difficult to control the sensor azimuth of the devices. In this invention, sensor azimuth is defined as the direction towards which the sensor points within the borehole. While the well logging devices trip up the borehole when a well logging operator pulls the wire cable from the well, the sensor azimuth of logging device would move towards different directions. FIG. 8 schematically illustrates a borehole 801 with a track of sensor azimuth during a particular logging trip. In FIG. 8, a logging device (not shown) is run within borehole 801, and the device sensor points to directions indicated by sensor azimuth track 802 at various depths. The sensor azimuth data is obtained by comparing the direction of the sensor with that of magnetic north, which is determined by a gyro device (not shown) within the logging device.

Figure 10:
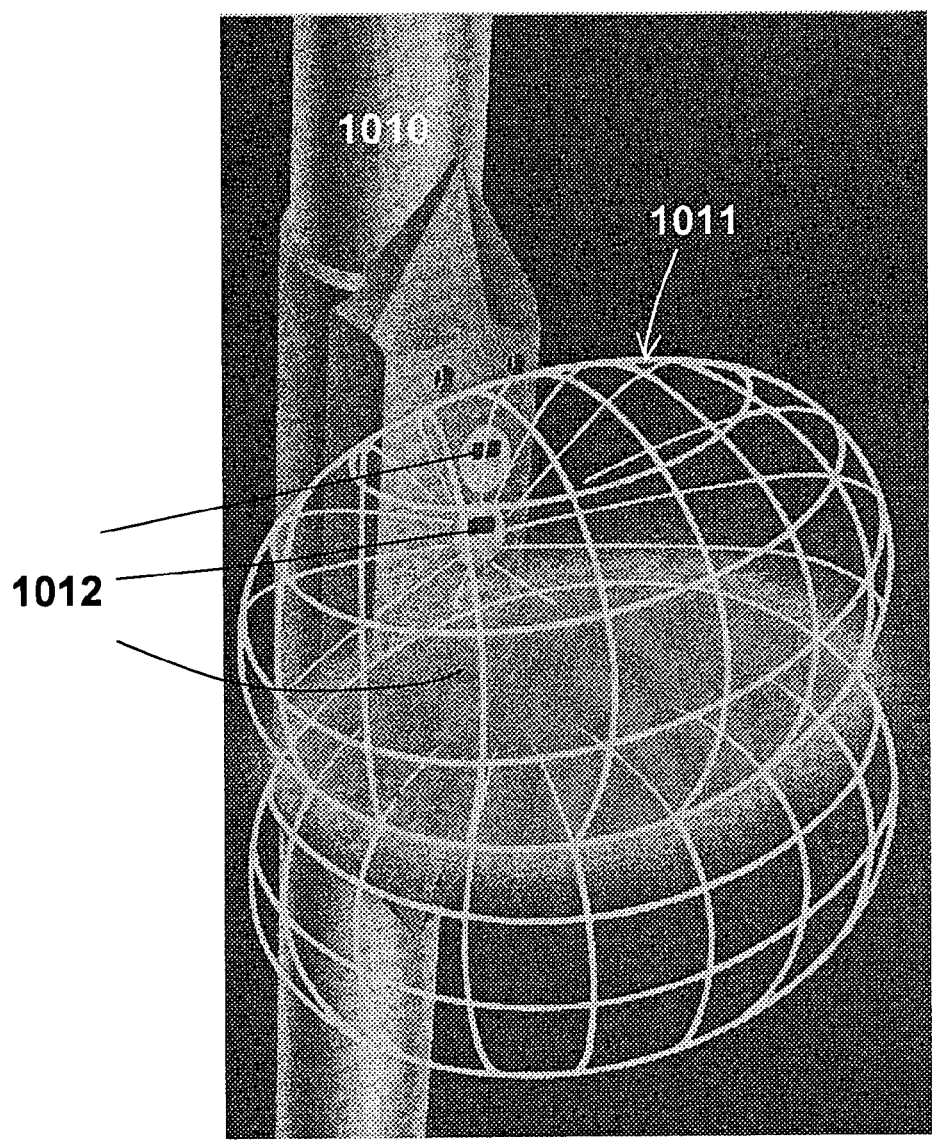
FIG. 10 shows a well logging device and a sensor volume of investigation.

Using the methods and systems of this invention it is possible to display geological formation information on the surface of the device sensor volume of investigation. FIG. 10 schematically shows a logging device and device sensor volume of investigation. In the particular case of FIG. 10, the logging device 1010 has sensors 1012 attached thereto. The sensors are capable of investigating a volume of geological formation 1011 at any given depth. Geological formation data image can be attached to (or exposed by) the surface of the volume of investigation 1011 or a cross section of 1011.

In FIG. 10, while the logging device 1010 trips up the borehole (not shown), sensor volume of investigation 1011 moved up the borehole together with logging device 1010 forming a band along its track (similar to sensor azimuth track 802 in FIG. 8). This band can be projected to the cylindrical surface representing the depth of investigation to form a display area such as 903 in FIG. 9.

Figure 9:
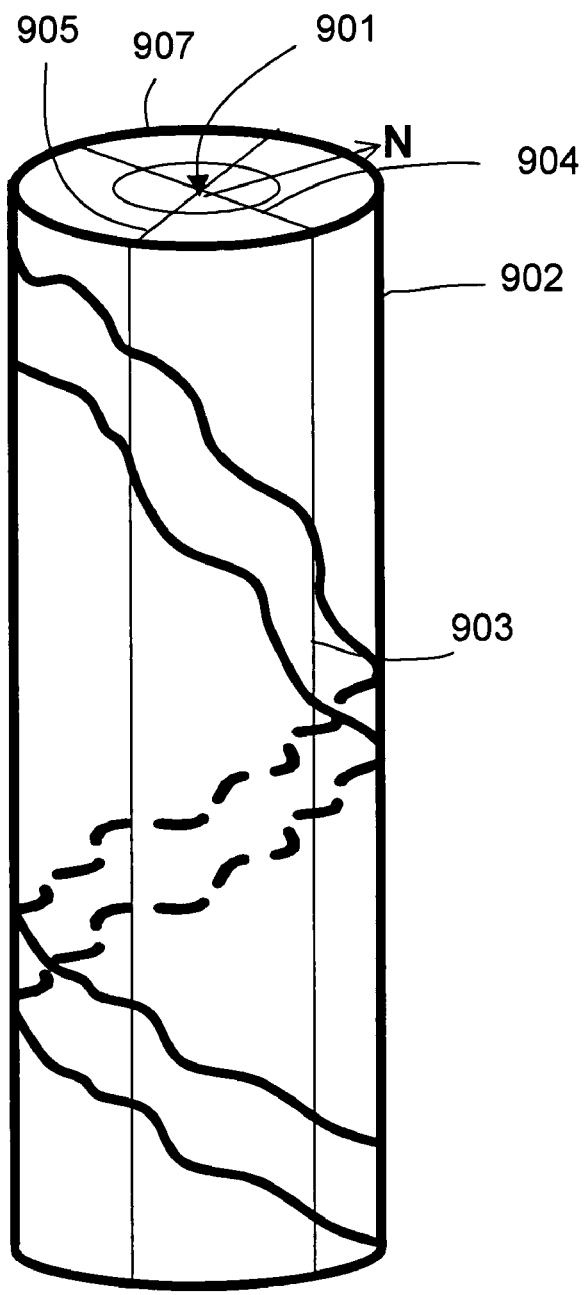
FIG. 9 shows a section of cylindrical surface representing a section of geological formation and an area on which images representing geological formation information are attached.

Using the systems and methods of this invention, geological formation data obtained through well logging can be presented on cylindrical surfaces representing the depth of investigation along the sensor azimuth track 802 (FIG. 8). For example, FIG. 9 shows geological formation data displayed on a display area 903, which is on the cylindrical surface 902. Area 903 is a projection of the volume of investigation of the particular logging device on cylindrical surface 902. It is to be understood that the cylindrical surface 902 can be dissected into sectors using the systems and methods of this invention, for example along azimuths 904 and 905. As shown in FIG. 9, the two planes dissecting cylindrical surface 902 at azimuth 904 and 905 also intersect each other at the axis 901 of the borehole 907.

Figure 11:
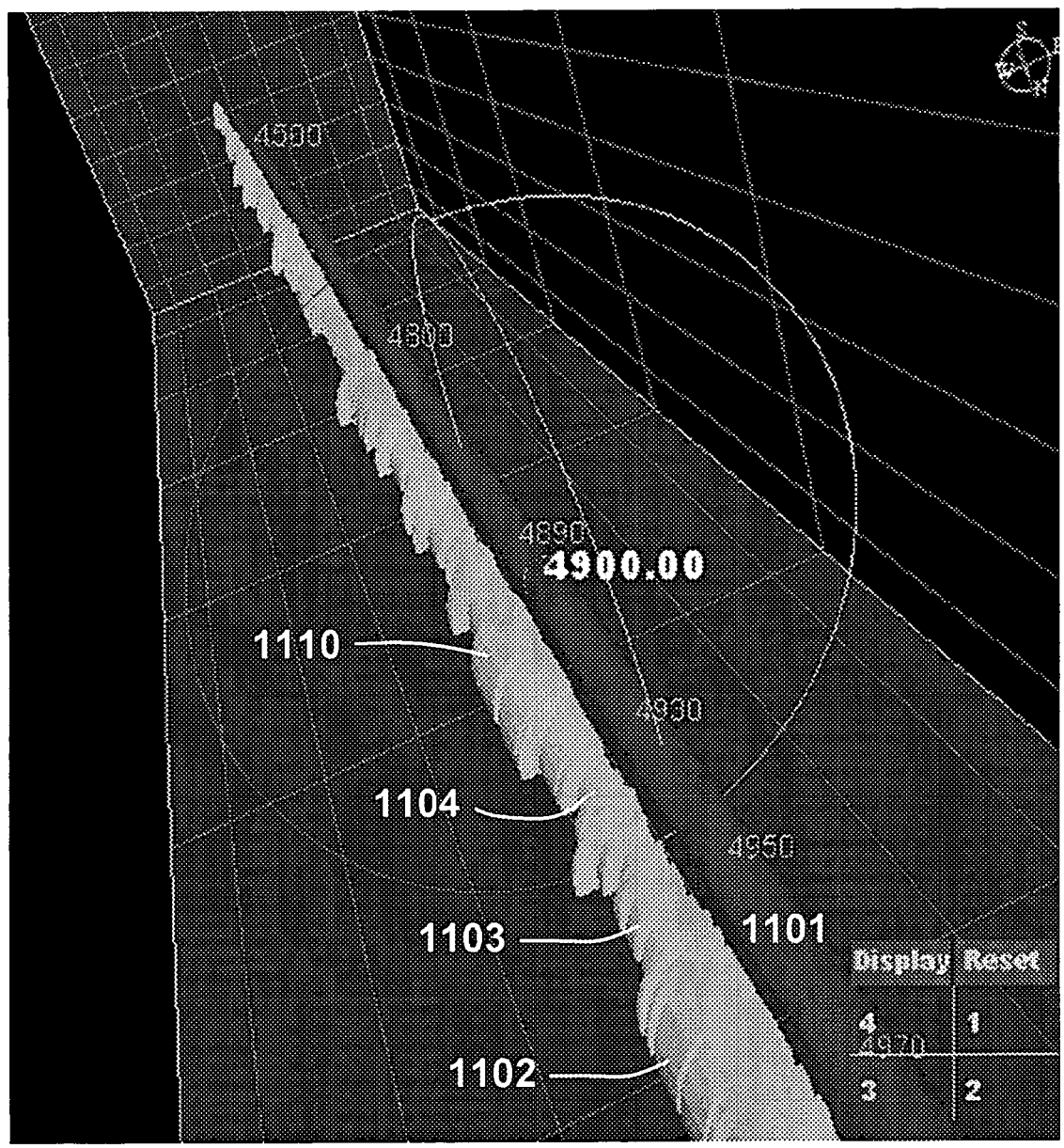
FIG. 11 shows a borehole and cylindrical surfaces each representing a distance away from the borehole with images representing geological formation information attached to (or exposed by) the cylindrical surfaces.

One embodiment of this invention provides for methods and systems for selectively displaying the geological formation information. Thus only data within a certain range is displayed using this embodiment of the invention. FIG. 11 schematically shows a borehole 1101 with one sector of geological formation 1110. Several cylindrical surfaces with different diameters representing different depth of investigation are provided for. As shown in FIG. 11, data images 1102 indicates that at the particular radial distance represented by the cylindrical surface on which data image 1102 is attached the formation property falls within the range which the human operator has selected. Similarly, data image 1103 and 1104 indicate that formation property at the particular radial distance represented by the cylindrical surface on which data images 1103 and 1104 are attached fall within the range which the human operator has selected. An example use of the embodiment would be where the human operator only wishes to investigate the zones where the resistivity exceeds 2 ohm-m, and the porosity is within the range of 10-30 p.u. The human operator would have an option to enter these values into the computer, and zones falling within the range would be highlighted, and zones that do not fall within the range would be made translucent or transparent. In FIG. 11, zones do not fall within the range selected range are made transparent.

The systems and methods of this invention can be used for the presentation of interpreted information as well as raw well logging data and processed well logging data. Interpreted information is defined in this invention as any information that is derived at through analysis of raw well logging data. Examples of interpreted information include interpretations, opinions, recommendations, and expert advice. For example, although an expert engineer in the discipline of reservoir engineering understands that the fast shear azimuth represents the azimuth of maximum stress, and may be the preferred direction in which to perforate the formation, a layman may not have such knowledge. In one embodiment of this invention, the display may indicate "preferred perforation direction" in the direction of "fast shear azimuth". As another example, one embodiment of this invention can label a particular zone as "damaged zone" from the variable values of shear slowness with radial depth into the formation. Identifying damaged zones is the purpose of making shear slowness measurements.

Using the methods and systems of this invention it is possible to calculate geological formation parameters at positions where there is no measurement from data at nearby location. The systems and methods employ interpolation and extrapolation from nearby data points to fill up data for any location on the same cylindrical surfaces and on the wings between different cylindrical surfaces. For example, data obtained on logs with the same depth of investigation with different sensor azimuths can be used to interpolate for data at positions between the two sensor azimuths. Data obtained using logging devices with different depth of investigation can be used to interpolate for data between the two depths. Borehole size measured using a two-axis caliper log can be used to calculate radius of the borehole at any azimuth by interpolation.

The methods and systems of this invention are intended to provide as much convenience to the human operator as possible. Thus the systems and methods allow a person who has little knowledge of well logging analysis to view the logging data and arrive at correct conclusions. To achieve this goal, the methods and systems of this invention allow viewing borehole and formation information display automatically, so that a human operator does not have to input any command to allow the computer to continue to display updated and different views of the formation information. The systems and methods also allow a person with little computer programming capability to operate the system. In one embodiment of this invention, voice recognition programs were implemented so that commands can be given to the computer by talking to a microphone that is connected to the computer system.

The foregoing description of the preferred and alternate embodiments of the present invention has been presented for purposes of illustration and description. It is not intended to be exhaustive or limit the invention to the precise examples described. Many modifications and variations will be apparent to those skilled in the art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

We claim:

1. A method for displaying on a computer graphical user interface geological formation information, comprising the steps of:

displaying a first cylindrical surface volume representing a first depth of investigation, displaying a second cylindrical surface volume representing a second depth of investigation, where each cylindrical surface volume has cylinder walls equidistant from the center of a simulated cylindrical borehole;

graphically slicing said cylindrical surface volumes with at least one plane coplanar with the axis of said cylindrical surface volume along a radius into sectors thereby exposing wings between two said cylindrical surface volumes, and attaching images of geological formation information onto said wings.

2. The method according to claim 1, wherein said step of graphically slicing said cylindrical surfaces volumes comprises the step of slicing said cylindrical surface volumes into four quadrants and positioning said quadrants around said borehole center for simultaneous viewing.

3. The method according to claim 1, wherein said step of graphically slicing said cylindrical surfaces volumes comprises the step of slicing said cylindrical surface volumes into sectors at an azimuth chosen by a human operator.

4. The method according to claim 1, wherein said step of graphically slicing said cylindrical surface volumes comprises the step of displaying a plurality of values within a cell along said slicing, said cell being a fractional volume of geological formation.

5. The method according to claim 1, further comprising the steps of allowing said geological formation information displayed on said cylindrical surface volumes to be displayed automatically so that said geological formation information on one of said cylindrical surface volumes is displayed at a first time period, said geological formation information on another of said cylindrical surface volumes is displayed at a second time period following said first time period, and so on.

6. The method according to claim 1, where said geological formation information is interpolated well logging data where no well logging data are available.

7. The method according to claim 1, further comprising the step of allowing said geological formation information displayed on said cylindrical surface volumes to be data restricted to within a certain range as chosen by a human operator.

8. The method according to claim 1, where said geological formation information are interpreted information.

9. A method for displaying on a computer graphical user interface geological formation information, comprising the steps of displaying any number of a cylindrical surface volumes representing a given depth of investigation of geological formation surrounding a borehole, each cylindrical surface volume having cylinder walls equidistant from the center of the borehole, graphically slicing said cylindrical surface volumes with at least one plane coplanar to the axis of said cylindrical surface into sectors thereby exposing wings on said sectors, displaying geological formation information on said cylindrical surfaces and wings, and allowing selectively moving one said sector away from other said sectors on said computer graphical interface so as to facilitate data display and analysis.

10. The method according to claim 1, where said geological formation information is extrapolated well logging data where no well logging data are available.

* * * * *